United States Patent
Wang et al.

(10) Patent No.: US 10,168,577 B2
(45) Date of Patent: Jan. 1, 2019

(54) DISPLAY PANEL AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Junwei Wang, Beijing (CN); Weitao Chen, Beijing (CN); Xiaopeng Cui, Beijing (CN)

(73) Assignees: BOE TECHNOLGOY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 28 days.

(21) Appl. No.: 15/036,021

(22) PCT Filed: Oct. 9, 2015

(86) PCT No.: PCT/CN2015/091550
§ 371 (c)(1),
(2) Date: May 11, 2016

(87) PCT Pub. No.: WO2016/176961
PCT Pub. Date: Nov. 10, 2016

(65) Prior Publication Data
US 2017/0102590 A1   Apr. 13, 2017

(30) Foreign Application Priority Data
May 6, 2015 (CN) .......................... 2015 1 0228123

(51) Int. Cl.
*G02F 1/133* (2006.01)
*G02F 1/1337* (2006.01)
(Continued)

(52) U.S. Cl.
CPC .... *G02F 1/133707* (2013.01); *G02F 1/13394* (2013.01); *G02F 1/133512* (2013.01);
(Continued)

(58) Field of Classification Search
None
See application file for complete search history.

(56) References Cited

U.S. PATENT DOCUMENTS

| 6,188,457 B1* | 2/2001 | Liu .................... G02F 1/133753 349/124 |
| 2003/0025870 A1* | 2/2003 | Kikkawa ........... G02F 1/133707 349/187 |

(Continued)

FOREIGN PATENT DOCUMENTS

| CN | 1469162 A | 1/2004 |
| CN | 1530720 A | 9/2004 |

(Continued)

OTHER PUBLICATIONS

First Chinese Office Action dated Apr. 19, 2017; Appln. No. 201510228123.5.
(Continued)

*Primary Examiner* — James Dudek
(74) *Attorney, Agent, or Firm* — Ladas & Parry LLP

(57) ABSTRACT

A display panel and a display device are disclosed, and in a first substrate of the display panel, the first alignment film includes a plurality of first portions corresponding to the plurality of first alignment adjustment structures each having a first surface, the fluctuation direction of the first surface and the fluctuation direction of each first portion are consistent with the alignment direction of liquid crystal molecules in the liquid crystal layer induced by the first alignment film; in a second substrate of the display panel, the second alignment film includes a plurality of second por-
(Continued)

tions corresponding to the plurality of second alignment adjustment structures, the fluctuation direction of the second surface and the fluctuation direction of each second portion are consistent with the alignment direction of the liquid crystal molecules in the liquid crystal layer induced by the second alignment film.

17 Claims, 4 Drawing Sheets

(51) Int. Cl.
*G02F 1/1335* (2006.01)
*G02F 1/1339* (2006.01)
*G02F 1/1343* (2006.01)
*G02F 1/1362* (2006.01)

(52) U.S. Cl.
CPC .. *G02F 1/133784* (2013.01); *G02F 1/134336* (2013.01); *G02F 1/134363* (2013.01); *G02F 1/136286* (2013.01); *G02F 2001/133749* (2013.01); *G02F 2001/134345* (2013.01); *G02F 2001/134372* (2013.01); *G02F 2201/121* (2013.01); *G02F 2201/123* (2013.01)

(56) References Cited

U.S. PATENT DOCUMENTS

| | | |
|---|---|---|
| 2005/0237471 A1 | 10/2005 | Kawamura |
| 2005/0270449 A1 | 12/2005 | Koma et al. |
| 2012/0206667 A1 | 8/2012 | Kroll et al. |

FOREIGN PATENT DOCUMENTS

| | | |
|---|---|---|
| CN | 1690783 A | 11/2005 |
| CN | 1700066 A | 11/2005 |
| CN | 1800936 A | 7/2006 |
| CN | 101923251 A | 12/2010 |
| CN | 102937763 A | 2/2013 |
| CN | 103676297 A | 3/2014 |
| CN | 104765200 A | 7/2015 |
| JP | 11-249141 A | 9/1999 |
| JP | 2013-506165 A | 2/2013 |

OTHER PUBLICATIONS

International Search Report and Written Opinion dated Feb. 15, 2016; PCT/CN2015/091550.

* cited by examiner

DISPLAY PANEL AND DISPLAY DEVICE

TECHNICAL FIELD

At least one embodiment of the present disclosure relates to a display panel and a display device.

BACKGROUND

Currently, liquid crystal displays (LCDs) are mainstream display devices, and each comprises an array substrate and an opposing substrate that are arranged opposite to each other and a liquid crystal layer disposed therebetween, and controls light by controlling the deflection degree of liquid crystal molecules in the liquid crystal layer via the control of the voltage between pixel electrodes and common electrodes. LCDs may include a vertical electric field type and a horizontal electric field type. In a vertical electric field type LCD, pixel electrodes and common electrodes are respectively disposed on an array substrate and an opposing substrate. In a horizontal electric field type LCD, both pixel electrodes and common electrodes are disposed on an array substrate.

In an LCD, an alignment film is disposed on both the array substrate and the opposing substrate and configured to allow the liquid crystal molecules in the liquid crystal layer to produce an initial alignment direction. The alignment technology of the liquid crystal molecules includes a rubbing alignment technology and a non-rubbing alignment technology such as ion beam etching induced alignment. The initial alignment status of the liquid crystal molecules may include horizontal alignment and vertical alignment.

Advanced super dimension switch (ADS) technology is widely applied in display devices due to the advantages of high resolution, high transmittance, low power consumption, wide viewing angle, high aperture ratio, low chromatic aberration, etc. In an ADS mode LCD, both pixel electrodes and common electrodes are disposed on an array substrate; the slit pixel electrodes are disposed above the plate common electrodes; and the initial alignment status of the liquid crystal molecules is horizontal alignment.

SUMMARY

The embodiment of the present disclosure provides a display panel and a display device, which reduce the included angle between liquid crystal molecules and the horizontal direction of a horizontal electric field type LCD device under a L0 frame (namely a black frame) and hence solve the problem of color shift at left and right large viewing angles of the horizontal electric field type LCD device under the L0 frame.

At least an embodiment of the present disclosure provides a display panel, comprising: a first substrate comprising a first base substrate, a first alignment film disposed on the first base substrate, and a plurality of first alignment adjustment structures disposed between the first base substrate and the first alignment film, in which the first alignment film includes a plurality of first portions corresponding to the plurality of first alignment adjustment structures respectively; a second substrate arranged opposite to the first substrate and comprising a second base substrate, a second alignment film disposed on the second base substrate, and a plurality of second alignment adjustment structures disposed between the second base substrate and the second alignment film, in which the second alignment film includes a plurality of second portions corresponding to the plurality of second alignment adjustment structures respectively; and a liquid crystal layer disposed between the first alignment film and the second alignment film, wherein each first alignment adjustment structure includes a first surface facing the first alignment film, and the fluctuation direction of the first surface and the fluctuation direction of each first portion are consistent with the alignment direction of liquid crystal molecules in the liquid crystal layer induced by the first alignment film; and each second alignment adjustment structure includes a second surface facing the second alignment film, and the fluctuation direction of the second surface and the fluctuation direction of each second portion are consistent with the alignment direction of the liquid crystal molecules in the liquid crystal layer induced by the second alignment film.

At least an embodiment of the present disclosure provides a display device comprising the above-mentioned display panel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1A:
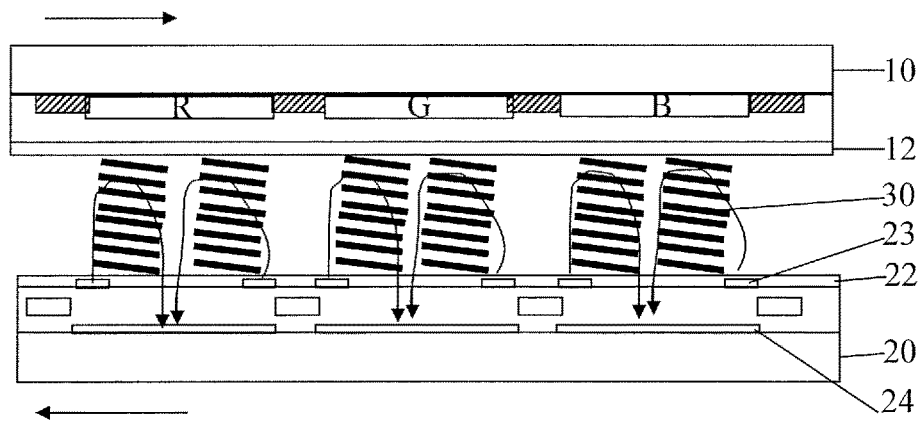
FIG. 1a is a schematic structural view of an ADS mode LCD device.

The horizontal electric field types of LCD may include in-plane switching (IPS) type, fringe field switching (FFS) type, ADS type, etc. For instance, FIG. 1a is a schematic sectional view of an ADS mode LCD device. As illustrated in FIG. 1a, the ADS mode LCD device comprises an opposing substrate 10, an array substrate 20 and a liquid crystal layer 30. The array substrate 20 is provided with slit electrodes 23 and plate electrodes 24, and the formed electric field lines are shown with curved arrows in the drawing. The alignment direction (as shown by an arrow in the upper part) of liquid crystal molecules in the liquid crystal layer 30 induced by an alignment film 12 on the opposing substrate 10 is from left to right, and the alignment direction (as shown by an arrow in the lower part) of the liquid crystal molecules induced by an alignment film 22 on the array substrate 20 is from right to left.

In the manufacturing process of the ADS mode LCD device as shown in FIG. 1a, due to the limitation of the rubbing alignment technology, the liquid crystal molecules will produce certain pre-tilt angles (TBA) on surfaces of the alignment films, namely the included angle between a liquid crystal director and the alignment direction of the liquid crystal molecules induced by the alignment film. The liquid crystal director is relevant to the alignment technology. For instance, as for rubbing alignment, the liquid crystal director is titled up along the rubbing direction; and as for ion beam etching induced alignment, the liquid crystal director is titled up along the opposite direction of etching beams. In FIG. 1a, the arrow disposed in the upper part indicates the alignment direction of the liquid crystal molecules induced by the alignment film 12 on the opposing substrate 10, the arrow in the lower part indicates the alignment direction of the liquid crystal molecules induced by the alignment film 22 on the array substrate 20; and the liquid crystal molecules are deflected towards the top left relative to the horizontal direction. In the horizontal electric field type LCD device such as ADS mode as shown in FIG. 1a, the liquid crystal molecules in the liquid crystal layer generally have pre-tilt angles (namely the included angle between the liquid crystal layer and the horizontal direction) of about 2° to 3°.

Figure 1B:
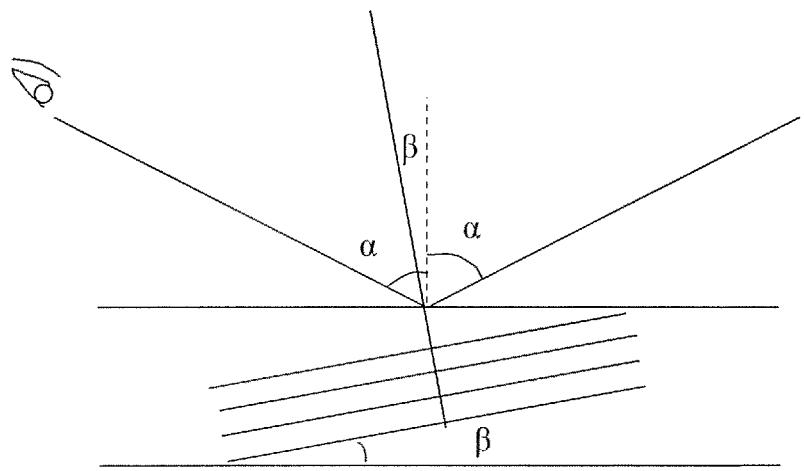
FIG. 1b is a schematic diagram illustrating the difference between left and right viewing angles when liquid crystal molecules have pre-tilt angles.

The inventors of the application has noticed in research that: in the horizontal electric field type LCD device such as an LCD of ADS mode, as the pre-tilt angle of the liquid crystal molecules in the liquid crystal layer 30 cannot reach 0°, under a L0 frame (namely a black frame), when the left viewing angle is the same as the right viewing angle, for instance, as illustrated in FIG. 1b, both the left viewing angle and the right viewing angle are a, as the liquid crystals have pre-tilt angle 3 (namely the included angle between the liquid crystal layer 30 and the horizontal direction), the actual right viewing angle is $\alpha+\beta$ and the actual left viewing angle is $\alpha-\beta$, so the difference between the actual left viewing angle and the actual right viewing angle is $2\beta$, and hence the $\Delta n$ of the left viewing angle and the right viewing angle is different. As the optical path is same but $\Delta n$ is unequal in the case of observing from the viewing angles such as the left and the right, the optical path difference and the light transmittance (both are relevant to $\Delta n*d$; $\Delta n$ represents the birefringence; and d represents the thickness of the liquid crystal layer, also referred to as cell gap) of the left viewing angle and the right viewing angle are unequal, so that the problem of severe color shift at large viewing angles of the horizontal electric field type LCD device such as ADS mode under the L0 frame can be produced and the phenomena of blue color at the right viewing angle, yellow color at the left viewing angle and severe light leakage can be caused.

Currently, the common technical means for solving the problem of color shift includes: adopting compensation films, controlling emitting light of backlight, adopting photo-alignment technology, etc. However, the means of adopting the compensation films has the problems of high cost and requirement of considering the high and low temperature reliability of the compensation films; the means of controlling the emitting light of the backlight has the problems of high cost, requirement of using high-cost film materials and requirement of collimating backlight; and the means of adopting the photo-alignment technology is immature for IPS and FFS modes and has high cost in material and equipment.

Therefore, those skilled in the art hope to provide a proposal which has low cost and can effectively solve the problem of color shift at large viewing angles of the horizontal electric field type LCD device under the L0 frame.

The embodiment of the present disclosure provides a display panel and a display device. Alignment adjustment structures are respectively disposed on the array substrate and the opposing substrate so that the alignment films on the substrates can be tilted relative to the horizontal direction, and hence the liquid crystal molecules in the liquid crystal layer can be more prone to be horizontally arranged compared to the case as shown in FIG. 1a, that is to say, the included angle between the liquid crystal molecules and the horizontal direction can be closer to 0°. Therefore, the problem of color shift at the left and right large viewing angles of the horizontal electric field type LCD device under the L0 frame can be solved.

First Embodiment

Figure 2:
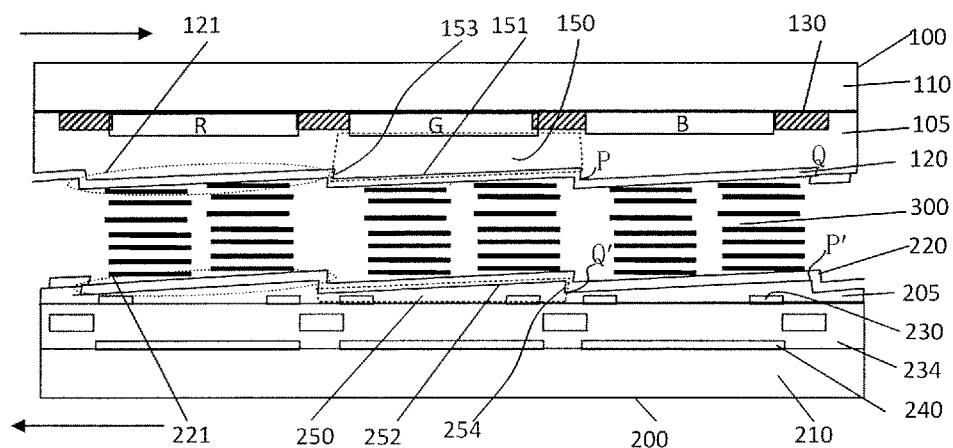
FIG. 2 is a schematic structural view of a display panel provided by a first embodiment of the present disclosure.

As illustrated in FIG. 2, the embodiment provides a display panel, which comprises a first substrate 100, a second substrate 200 and a liquid crystal layer 300 disposed between the first substrate 100 and the second substrate 200.

The first substrate 100 includes a first base substrate 110, a first alignment film 120 disposed on the first base substrate 110, and a plurality of first alignment adjustment structures 150 disposed between the first base substrate 110 and the first alignment film 120. The first alignment film 120 includes a plurality of first portions 121 (as shown by dotted lines in FIG. 2) corresponding to the plurality of first alignment adjustment structures 150. Each first alignment adjustment structure 150 includes a first surface 151 facing the first alignment film 120. The fluctuation direction of the first surface 151 and the fluctuation direction of each first portion 121 are consistent with the alignment direction (as shown by an arrow from left to right disposed in the upper part in FIG. 2) of liquid crystal molecules in the liquid crystal layer 300 induced by the first alignment film 120.

The second substrate 200 is arranged opposite to the first substrate 100 and includes a second base substrate 210, a second alignment film 220 disposed on the second base substrate 210, and a plurality of second alignment adjustment structures 250 disposed between the second base substrate 210 and the second alignment film 220. The second alignment film 220 includes a plurality of second portions 221 (as shown by dotted lines in FIG. 2) corresponding to the plurality of second alignment adjustment structures 250. Each second alignment adjustment structure 250 includes a second surface 252 facing the second alignment film 220. The fluctuation direction of the second surface 252 and the fluctuation direction of each second portion 221 are consistent with the alignment direction (as shown by an arrow from right to left disposed in the lower part in FIG. 2) of the liquid crystal molecules in the liquid crystal layer 300 induced by the second alignment film 220.

In the embodiment, the alignment adjustment structures are disposed between the alignment film and the base substrate provided with the alignment film, so that the alignment film is provided with inclined surfaces corresponding to the first surfaces/the second surfaces, and the fluctuation direction of each inclined surface is consistent with the alignment direction of the liquid crystal molecules induced by the alignment film. Therefore, the included angle between the liquid crystal molecules and the horizontal direction (the direction parallel to the first/second base substrate in FIG. 2) can be reduced and even reach 0°, so that the pre-tilt angle (namely the included angle between the liquid crystal molecules and the horizontal direction) of the liquid crystal molecules in the liquid crystal layer of the display panel can be close to or equal to 0°, and hence the problem of color shift at large viewing angles of the horizontal electric field type LCD device under the L0 frame can be avoided.

In the embodiment of the present disclosure, the fluctuation direction of a structure refers to the direction from an orthographic projection of the top of the structure on the base substrate provided with the structure to an orthographic projection of the bottom of the structure on the base substrate. The top of the structure refers to one end of the structure which is the farthest from the base substrate provided with the structure, and the bottom of the structure refers to one end of the structure which is the closest to the base substrate provided with the structure.

For instance, as illustrated in FIG. 2, the fluctuation direction of the first surface 151 refers to the direction from an orthographic projection of the top P of the first surface 151 on the first base substrate 110 to an orthographic projection of the bottom Q of the first surface 151 on the first base substrate 110. In the case as shown in FIG. 2, the fluctuation direction of the first surface 151 is from left to right.

For instance, as illustrated in FIG. 2, the fluctuation direction of the second surface 252 refers to the direction of an orthographic projection of the top P' of the second surface 252 on the second base substrate 210 to an orthographic projection of the bottom Q' of the second surface 252 on the second base substrate 210. In the case as shown in FIG. 2, the fluctuation direction of the second surface 252 is from right to left.

It should be noted that alignment structures such as recesses are generally disposed on one side of the alignment film facing the liquid crystal layer. The fluctuation direction of the portion in the alignment film of the embodiment is relevant to the entirety of the portion. The influence of the alignment structure can be ignored.

In the embodiment, in order to achieve horizontal alignment of the liquid crystal molecules in the liquid crystal layer 300, the alignment directions of the liquid crystal molecules induced by the two alignment films disposed on the first substrate and the second substrate respectively may be parallel or antiparallel. The alignment directions of the liquid crystal molecules induced by the first alignment film 120 and the second alignment film 220 in FIG. 2 are only illustrative. But the embodiment is not limited thereto. For instance, the alignment directions of the liquid crystal molecules induced by the first alignment film 120 and the second alignment film 220 may also be opposite to the case as shown in FIG. 2, namely the alignment direction of the liquid crystal molecules induced by the first alignment film 120 may be from right to left and the alignment direction of the liquid crystal molecules induced by the second alignment film 220 may be from left to right.

In addition, one of the first substrate and the second substrate is an array substrate and the other is an opposing substrate. For instance, the opposing substrate is a color filter (CF) substrate; the first base substrate and the second base substrate may be a glass substrate, a quartz substrate, a plastic substrate, etc.; and the first alignment film and the second alignment film may be manufactured by materials and alignment technology commonly used in the field. No further description will be given here.

In at least one example of the embodiment, the alignment adjustment structures may be made from transparent materials so as to avoid the influence on the aperture ratio.

For instance, as illustrated in FIG. 2, the first substrate 100 includes black matrixes (BMs) 130 and a plurality of sub-pixels (e.g., including red sub-pixels R, green sub-pixels G and blue sub-pixels B) arranged in a matrix, disposed on the first base substrate 110. The BMs 130 may include a plurality of first extensions and a plurality of second extensions which are intercrossed with each other to form meshes; the sub-pixels may be disposed at openings of the meshes; and as illustrated in FIG. 2, the BMs 130 may be disposed between the sub-pixels. A first functional layer 105 including the plurality of first alignment adjustment structures 150 and the first alignment film 120 covering the first functional layer 105 are disposed on the sub-pixels and the BMs 130 in sequence. For instance, the materials of the first functional layer 105 may include silicon nitride, silicon oxide, resins, etc. The first alignment adjustment structure 150 may be a convex or concave structure formed by the materials of the first functional layer 105.

For instance, the second substrate 200 includes plate common electrodes 240, an insulating layer 234 (e.g., a laminated layer of a gate insulating layer and a passivation layer), slit pixel electrodes 230 disposed on the insulating layer 234, a second functional layer 205 including a plurality of second alignment adjustment structures 250, and the second alignment film 220 disposed on the second functional layer 205, which are disposed on the second base substrate 210 in sequence. The materials of the second functional layer 205 may include silicon nitride, silicon oxide, resins, etc. The second alignment adjustment structure 250 may be a convex or concave structure formed by the materials of the second functional layer 205.

It should be noted that any one of the sub-pixels and the BMs may be disposed on the first substrate or the second substrate. Description is given in FIG. 2 only by taking the case that the first substrate 100 is provided with the BMs 130, one R sub-pixel, one G sub-pixel and one B sub-pixel as an example.

The display panel provided by the embodiment is applicable to the horizontal electric field type LCD panel. Thus, one of the first substrate and the second substrate includes pixel electrodes and common electrodes. The substrate provided with the pixel electrodes and the common electrodes is an array substrate, and the other substrate is an opposing substrate. The pixel electrodes and the common electrodes may be disposed in the same layer in IPS mode and may also be disposed in different layers in ADS or FFS mode. In the ADS mode, one kind of the pixel electrodes and the common electrodes are slit electrodes and the other kind are plate electrodes. In the FFS mode, both the pixel electrodes and the common electrodes are slit electrodes. Moreover, the pixel electrodes may be disposed on the upper layer and the common electrodes may be disposed on the lower layer, or the pixel electrodes may be disposed on the lower layer and the common electrodes may be disposed on the upper layer. Description is given in the embodiment and the accompanying drawings only by taking the case that the second substrate 200 includes the slit pixel electrodes 230 and the plate common electrode 240 as an example.

In at least one example of the embodiment, in order to better transmit surface characteristics (e.g., the tilt direction, angle, shape, etc. of the first/second surface) of the alignment adjustment structures to corresponding portions of corresponding alignment films, so that the included angle between the liquid crystal molecules and the horizontal direction can be conveniently controlled, one of the following two means or a combination of both may be adopted.

First way: a surface provided with each first portion therein 121 may be parallel to the first surface 151 of the first alignment adjustment structure 150 corresponding to the first portion; and/or a surface provided with each second portion therein 221 may be parallel to the second surface 252 of the second alignment adjustment structure 250 corresponding to the second portion.

Second way: the first surface 151 of the first alignment adjustment structure 150 may be bonded together with the first alignment film 120; and/or the second surface 252 of the second alignment adjustment structure 250 may be bonded together with the second alignment film 220. That is to say, a layer provided with the first surface 151 and a layer provided with the first alignment film 120 are adjacent to each other; and/or a layer provided with the second surface 252 and a layer provided with the second alignment film 220 are adjacent to each other. For instance, the insulating layer adjacent to the alignment film may be adopted to form the alignment adjustment structures.

It should be noted that alignment structures such as recesses are generally disposed on one side of the alignment film facing the liquid crystal layer. The surface provided with the portion of the alignment film is relevant to the entirety of the portion. The influence of the alignment structure can be ignored.

In addition, the alignment film may be formed on insulating materials and may also be formed on non-insulating materials. For instance, as illustrated in FIG. 2, the second alignment adjustment structure 250 may also be formed by the insulating layer such as the passivation layer between the pixel electrodes 230 and the common electrodes 240. In this case, the second alignment film 220 may be formed on a layer provided with the pixel electrodes 230.

In at least one example of the embodiment, each sub-pixel may correspond to at least one first surface and at least one second surface, namely corresponding to at least one first alignment adjustment structure and at least one second alignment structure. As liquid crystal domains may be formed at junctions of adjacent alignment adjustment structures on the same substrate (namely the arrangement of liquid crystals is more complicated compared with other areas), in order to avoid the influence on the aperture ratio, each sub-pixel may correspond to 1 to 5 first alignment adjustment structures and 1 to 5 second alignment adjustment structures.

For instance, each sub-pixel may correspond to at least one first surface 151 and at least one second surface 252, and the first surface 151 and the second surface 252 may be in one-to-one correspondence (namely the first alignment adjustment structure 150 and the second alignment adjustment structure 250 are in one-to-one correspondence). In this case, the surface (e.g., the first surface 151) of the first alignment adjustment structure 150 facing the liquid crystal layer 300 and the surface (e.g., the second surface 252) of the second alignment adjustment structure 250 facing the liquid crystal layer 300 may be set to be parallel to each other, so that the influence of the alignment adjustment structure on the thickness of the liquid crystal layer can be avoided as much as possible and the thickness of the liquid crystal layer 300 can be kept consistent as much as possible. Thus, the optical path difference between the left viewing angle and the right viewing angle when observed from the left viewing angle and the right viewing angle can be reduced as much as possible, and hence the problem of color shift at large viewing angles of the display panel under the L0 frame can be avoided as much as possible.

For instance, when the first alignment adjustment structure 150 and the second alignment adjustment structure 250 are in one-to-one correspondence and the surfaces thereof corresponding to the liquid crystal layer are parallel to each other, an orthographic projection of a surface of the second alignment adjustment structure 250 facing the liquid crystal layer 300 on the first base substrate 110 may also be superimposed with an orthographic projection of a surface of the first alignment adjustment structure 150 facing the liquid crystal layer 300 on the first base substrate 110. Thus, the surfaces of the first and second alignment adjustment structures facing the liquid crystal layer not only can be guaranteed to be parallel to each other but also can be guaranteed to have same shape and size. Therefore, the influence of the alignment adjustment structures on the thickness of the liquid crystal layer can be further avoided, so that the uniformity of the thickness of the liquid crystal layer can be guaranteed, and hence the problem of color shift can be more conveniently avoided.

For instance, as illustrated in FIG. 2, each sub-pixel may correspond to one first surface 151 and one second surface 252, and each first surface 151 and each second surface 252 correspond to one sub-pixel, namely the sub-pixel, the first surface 151 and the second surface 252 are in one-to-one correspondence, so that the sub-pixel, the first alignment adjustment structure 150 and the second alignment adjustment structure 250 are also in one-to-one correspondence. In this case, both the edge of the surface of each first alignment adjustment structure 150 facing the liquid crystal layer 300 and the edge of the surface of each second alignment adjustment structure 250 facing the liquid crystal layer 300 may be disposed between adjacent sub-pixels, so that a junction of adjacent alignment adjustment structures corresponds to a BM area between the sub-pixels, and hence the phenomenon that the display effect is affected by the liquid crystal domains at the junctions can be avoided as much as possible.

In at least one example of the embodiment, at least one of the first surface 151 and the second surface 252 may be a plane. Description is given in FIG. 2 by taking the case that both the first surface 151 and the second surface 252 are planes as an example.

As illustrated in FIG. 2, each first alignment structure 150 further includes a third surface 153 intercrossed with one end (e.g., the top P) of the first end 151. The third surface 153 is disposed between adjacent first surfaces 151, namely between adjacent first alignment adjustment structures 150, along the fluctuation direction of each first surface 151. When the adjacent first alignment adjustment structures 150 are formed continuously, namely there is no gap between the adjacent first alignment adjustment structures 150, the third surface 153 may be connected with the adjacent first surface 151.

The first alignment film 120 includes a plurality of first portions 121, and each first portion 121 corresponds to one first alignment adjustment structure 150 and includes a surface corresponding to the first surface 151 and the third surface 153 of the first alignment adjustment structure 150. Thus, the first alignment film 120 has height difference at a junction of adjacent first surfaces 151 (namely a position provided with the third surface 153), and hence the arrangement of liquid crystals at the junction can be affected. Therefore, in order to avoid the production of liquid crystal domains at the junctions by the liquid crystals as much as possible, one of the following two means or a combination of both may be adopted. Detailed description will be given below to the two means.

First way: the third surface 53 may be perpendicular to the first base substrate 110. It should be noted that perpendicularity refers to approximate perpendicularity. Particularly when each sub-pixel corresponds to a plurality of first surfaces, the third surface 153 is arranged to be perpendicular to the first base substrate 110, so that the production of liquid crystal domains by the liquid crystals at areas corresponding to the junctions of the adjacent first surfaces 151 can be avoided as much as possible.

Second way: the third surface 153 may be disposed at an area corresponding to the BM 130. For instance, the size of each first surface 151 is greater than the size of the sub-pixel corresponding to the first surface along the direction substantially parallel to the first base substrate 110, namely the edge of each first surface 151 is disposed on the outside of an area provided with the sub-pixel corresponding to the first surface (namely disposed at a gap between adjacent sub-pixels) along the direction parallel to the first base substrate 110. Thus, the third surface 153 disposed between the adjacent first surfaces 151 can correspond to the area provided with the BM 130.

Similarly, each second alignment adjustment structure 250 further includes a fourth surface 254 intercrossed with one end (e.g., the top P) of the second surface 252. The fourth surface 254 is disposed between adjacent second surfaces 252 along the direction parallel to the fluctuation direction of each second surface 252. The fourth surface 254 may also be arranged by at least one of the above first and second means, namely the fourth surface 254 may be perpendicular to the second base substrate 210 and/or the fourth surface 254 may be disposed at an area corresponding to the BM 130. For instance, the size of each second surface 252 is greater than the size of the sub-pixel corresponding to the second surface along the direction substantially parallel to the first base substrate 110, namely the edge of each second surface 252 is disposed on the outside of an area provided with the sub-pixel corresponding to the second surface (namely disposed at a gap between adjacent sub-pixels) along the direction parallel to the first base substrate 110. Thus, the fourth surface 254 disposed between the adjacent second surfaces 252 can correspond to the area provided with the BM 130.

In the example of the embodiment, when both the third surface 153 and the fourth surface 254 are disposed at the area corresponding to the BM 130, the third surface 153 and the fourth surface 254 are in one-to-one correspondence, and the first surface 151 and the second surface 252 are also in one-to-one correspondence.

As the pre-tilt angle of the liquid crystals in the horizontal electric field type LCD device is generally 2° to 3°, in at least one example of the embodiment, the included angle between the planar first surface 151 and the first base substrate 110 may be less than or equal to 3°, and the included angle between the planar second surface 252 and the second base substrate 210 may be less than or equal to 3°.

For instance, the included angle between the first surface 151 and the first base substrate 110 is preferably less than or equal to 2°, and the included angle between the second surface 252 and the second base substrate 210 is preferably less than or equal to 2°.

In the display panel, in a plurality of sub-pixels arranged in a matrix and disposed between the first base substrate 110 and the second base substrate 210, each row of sub-pixels may be periodically arranged according to color, e.g., arranged by RGBRGB means, and each column of sub-pixels may have a same color. For instance, each row of sub-pixels are arranged by the means of RRRRRR, GGGGGG or BBBBBB.

Figure 3A:
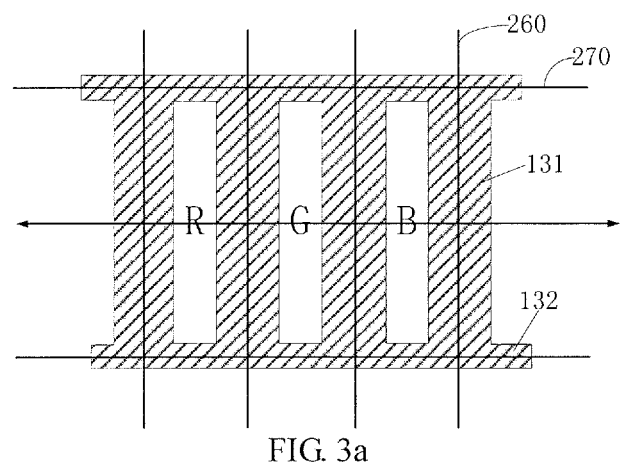
FIG. 3a is a schematic top view of sub-pixels in the ADS mode provided by a first embodiment of the present disclosure.

In the ADS mode or IPS mode display panel, the alignment direction of the liquid crystal molecules induced by the alignment film is generally along the row direction of the sub-pixels, as shown by an arrow in FIG. 3a. As the fluctuation directions of the first surface and the second surface are respectively consistent with the alignment directions of the liquid crystal molecules induced by the alignment films corresponding to the first surface and the second surface, in at least one example, the fluctuation directions of the first surface and the second surface may be consistent with the row direction of the sub-pixels.

Figure 3B:
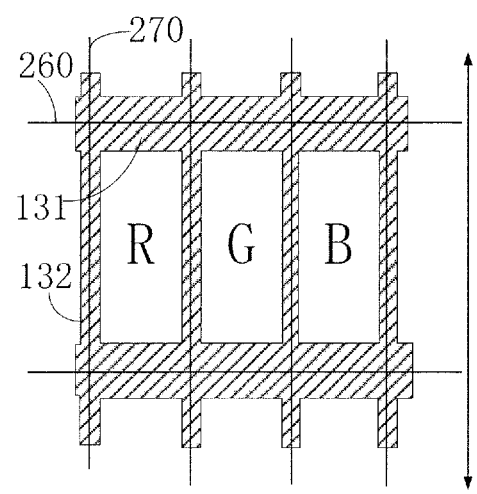
FIG. 3b is a schematic top view of sub-pixels in an FFS mode provided by the first embodiment of the present disclosure.

In the IPS mode display panel, the alignment direction of the liquid crystal molecules induced by the alignment film is generally along the column direction of the sub-pixels, as shown by an arrow in FIG. 3b. As the fluctuation directions of the first surface and the second surface are respectively consistent with the alignment directions of the liquid crystal molecules induced by the alignment films corresponding to the first surface and the second surface, in at least one example, the fluctuation directions of the first surface and the second surface may be consistent with the column direction of the sub-pixels.

A plurality of gate lines and a plurality of data lines which are intercrossed with each other are also disposed between the first base substrate and the second base substrate of the display device. The substrate provided with the gate lines and the data lines in the first substrate and the second substrate is an array substrate, and the other is an opposing substrate.

In at least one example of the embodiment, in order to ensure the aperture ratio, in the ADS or IPS display panel, as illustrated in FIG. 3a, each row of sub-pixels which are periodically arranged according to color may be arranged along the extension direction of a data line 270. Moreover, along the direction parallel to the first base substrate, the longitudinal direction of each sub-pixel may be along the extension direction of a gate line 260 and the transverse direction of each sub-pixel may be along the extension direction of the data line 270.

Similarly, in the IPS mode display panel, as illustrated in FIG. 3b, each row of sub-pixels which are periodically arranged according to color may be arranged along the extension direction of the gate line 260. Moreover, along the direction parallel to the first base substrate, the longitudinal direction of each sub-pixel may be along the extension direction of the data line 270 and the transverse direction of each sub-pixel may be along the extension direction of the gate line 260.

In at least one example of the embodiment, the first alignment adjustment structures may be discontinuously arranged and the second alignment adjustment structures may also be discontinuously arranged along the direction substantially perpendicular to the alignment directions of the liquid crystal molecules induced by the alignment films. Thus, the alignment adjustment structures cannot affect the coating levelability of the alignment films, so that the thickness of the alignment films can be uniform, and hence the remaining alignment liquid can be gathered at discontinuous positions of the alignment adjustment structures. As the discontinuous positions correspond to shielding areas of the BMs, the display cannot be affected. On this basis, in at least one example, both the first alignment adjustment structures and the second alignment adjustment structures can be continuously formed along the direction parallel to the alignment directions of the liquid crystal molecules induced by the alignment films.

For instance, in the ADS mode or IPS mode display panel, both the first alignment adjustment structures and the second alignment adjustment structures may be continuously arranged along the row direction of the sub-pixels; and both the first alignment adjustment structures and the second alignment adjustment structures may be discontinuously arranged along the column direction of the sub-pixels. For instance, as illustrated in FIG. 4, the first alignment adjustment structures 150 are continuously formed along the alignment direction (as shown by an arrow) of the liquid crystal molecules induced by the alignment film and discontinuously formed along the direction perpendicular to the alignment direction.

For instance, in the FFS mode display panel, both the first alignment adjustment structures and the second alignment adjustment structures may be continuously formed along the column direction of the sub-pixels; and both the first alignment adjustment structures and the second alignment adjustment structures may be discontinuously formed along the row direction of the sub-pixels.

Figure 4:
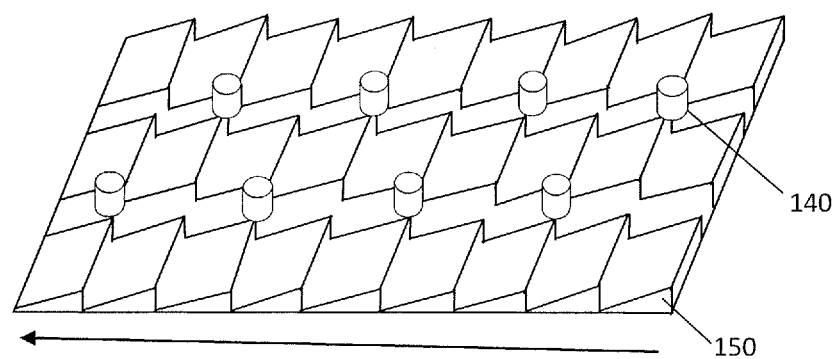
FIG. 4 is a schematic plan view of first alignment adjustment structures and spacers in the first embodiment of the present disclosure.
Figure 5:
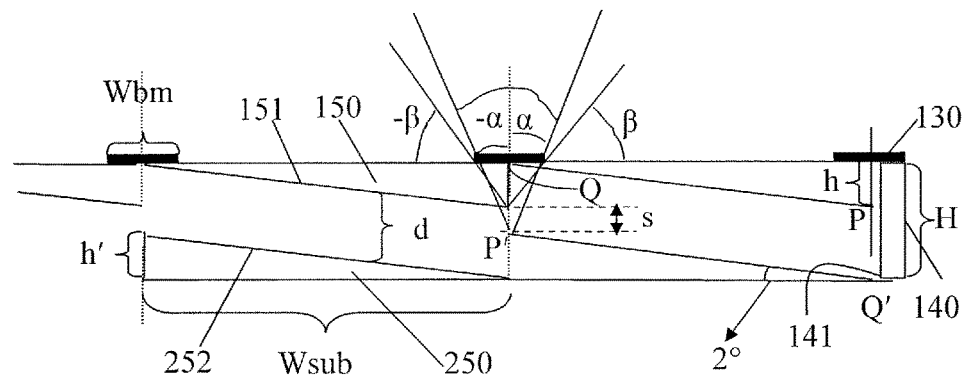
FIG. 5 is a schematic diagram illustrating the size relationship between structures in the display panel provided by the first embodiment of the present disclosure.

As illustrated in FIGS. 4 and 5, a plurality of spacers 140 for maintaining the thickness of the liquid crystal layer are also disposed between the first base substrate 110 and the second base substrate 210 of the display panel. As the liquid crystals within a specific range around each spacer 140 are relatively disorderly arranged and light-shielding ranges at junctions of first extensions and second extensions of the BMs 130 are large, the spacers 140 may be disposed at the junctions so as to reduce the influence of the spacers on the arrangement of the liquid crystals at the sub-pixel areas as much as possible.

As the first alignment films 120 and the second alignment films 220 are relatively thin, in the case of ignoring the influence of the thickness thereof, as illustrated in FIG. 5, the distance of a top 141 of each spacer 140 beyond the top P of the first alignment adjustment structure 150 (also referred to the top of the first surface 151) may be equal to the thickness d of the liquid crystal layer, and/or the distance of the top 141 of each spacer 140 beyond the top P' of the second alignment adjustment structure 250 (also referred to the top of the second surface 252) may also be equal to the thickness d of the liquid crystal layer. It should be noted that: in the embodiment, due to the first and second alignment adjustment structures, the liquid crystal layer corresponding to the alignment adjustment structures is provided with inclined surfaces, so that the thickness of the liquid crystal layer (namely the cell gap) in the embodiment of the present disclosure is the thickness of the liquid crystal layer along the direction perpendicular to the first/second base substrate, as shown by d in FIG. 5.

As illustrated in FIG. 4, the first alignment adjustment structure 150 and the plurality of spacers 140 may be arranged in the same layer side by side. Thus, in the same patterning process, the first alignment adjustment structures 150 and the spacers 140 may be formed by the control of the exposure of different areas, so that the technological process can be reduced. Moreover, in this case, the first functional layer 105 is the layer for forming the first alignment adjustment structures 150 and the spacers 140.

When the first alignment adjustment structures 150 and the spacers 140 are arranged in the same layer side by side and the influence on the thickness of the first alignment film 120 and the second alignment film 220 is ignored, in at least one example of the embodiment, the height H of each spacer 140 may be equal to the sum of the thickness d of the liquid crystal layer and the height of the top P of the first alignment adjustment structure 150 (namely the distance of both ends of the third surface 153 along the direction perpendicular to the first base substrate 110), and/or the height H of each spacer 140 (the height difference between the top and the bottom of each spacer) may be equal to the sum of the thickness d of the liquid crystal layer 300 and the height of the top P' of the second alignment adjustment structure 250 (namely the distance of both ends of the fourth surface 254 along the direction perpendicular to the second base substrate 210).

For instance, the height of the top P of the first alignment adjustment structure 150 may be 1 to 2 μm. For instance, the height of the top P' of the second alignment adjustment structure 250 may be 1 to 2 μm. The height of the top P of the first alignment adjustment structure 150 may be same with or different from the height of the top P' of the second alignment adjustment structure 250.

Description is given in FIG. 5 by taking the case that the height of the top P of the first alignment adjustment structure 150 is equal to the level difference h of the first surface 151 (namely the difference between the distance from the top P and the bottom Q to the first base substrate 110) and the height of the top P' of the second alignment adjustment structure 250 is equal to the level difference h' of the second surface 252 (namely the difference between the distance from the top P' and the bottom Q' to the second base substrate 210) as an example.

In at least one example, the first alignment adjustment structures 150 may be integrally formed by utilization of the layer for forming the spacers 140 via a gray gradient mask. The manufacturing process generally includes the following steps S1 to S5. Detailed description will be given below to the manufacturing process.

S1: determining the thickness T0 of the spacer layer according to the size of the sub-pixel, in which T0=h+d.

Taking the case that the pre-tilt angle of the alignment film is 2° for example, T0=Wsub*0.035+d, in which Wsub represents the width of the sub-pixel and d represents the cell gap.

S2: performing exposure and forming the first alignment adjustment structures 150 and the spacers 140 at the same time. As illustrated in FIG. 4, the spacers 140 may be disposed in wide BMs (namely Gate-side BMs).

For instance, the height H of each spacer may be: 4.42 µm>H>2.5 µm or 3.5 µm>H>2.5 µm.

In the step, as the mask corresponding to areas of the first alignment adjustment structures is gray gradient, the first alignment adjustment structures with uniform gradient may be formed.

S3: coating the alignment films.

For instance, the alignment films may be made from polyimide (PI) materials. The thickness of the alignment films is, for instance, 700 Å=0.07 um. The level difference of the first alignment adjustment structures 150 is ≥1 µm. As seen from the structure as shown in FIG. 4, as the first alignment adjustment structures are discontinuous among rows, the diffusion of the PI cannot be affected.

S4: performing rubbing process. The rubbing direction (namely the alignment direction) is the fluctuation direction of the first alignment adjustment structures, as shown in FIG. 4.

S5: performing one drop fill (ODF), sealing, etc.

Description is given in the above example by taking the case that the first alignment adjustment structures 150 and the spacers 140 are formed at the same time for example. In this case, the substrate provided with the first alignment adjustment structures 150 may be an opposing substrate (e.g., a CF substrate). The forming process of the second alignment adjustment structures on an array substrate is similar to that of the first alignment adjustment structures 150, as long as the spacers 140 are not formed in the process of forming the second alignment adjustment structures.

In at least one example, in order to achieve better process effect and ensure the uniformity of the level difference of the first/second alignment adjustment structures, the parameters of the display panel may be optimized. For instance, the short side (namely the width) of the sub-pixel may be less than or equal to 50 µm along the direction parallel to the first base substrate 110. For instance, the thickness of the alignment film may be less than or equal to 700 Å. For instance, the pre-tilt angle of the liquid crystals induced by the alignment film may be controlled to be about 2°. For instance, materials such as P1 with low pre-tilt angle (the pre-tilt angle is preferably about 2°) may be adopted.

In at least one example, considering that the elastic deformation range of the spacers 140 is less than or equal to 0.4 µm, in view of the optical anisotropic restriction of the liquid crystal materials, the thickness of the liquid crystal layer 300 may be 2.25 to 2.5 µm.

In at least one example, the level difference h of the first surface 151 may be 1 to 2 µm, and the level difference h' of the second surface 252 may be 1 to 2 µm.

In at least one example, the aperture ratio of CFs in the ADS mode is <60%.

Description is given below with reference to the schematic diagram illustrating the size relationship between structures in the display panel as shown in FIG. 5.

In FIG. 5, the first alignment adjustment structures 150 and the second alignment adjustment structures 250 are in one-to-one correspondence. The first surface 151 of the first alignment adjustment structure 150 and the second surface 252 of the second alignment adjustment structure 250 are parallel to each other and the included angle with the horizontal direction is both 2°.

Example 1: the thickness of the liquid crystal layer is d=2.5 µm, the pre-tilt angle of the liquid crystals induced by the first/second alignment films is TBA=2°; the width of the sub-pixel is Wsub=50 µm; the level difference of the first/second alignment adjustment structures is h=h'=Wsub*Tan 2°=1.746 µm; the minimum gap between the first and second substrates is s=2.5−1.74=0.76 µm>0.4 µm; the aperture ratio of the CFs in the ADS mode is 56.8%; the width of the BMs 130 (the width of the Gate-side BMs) is Wbm=20 µm; Wbm/2=10 µm; and the following results can be calculated according to tan α=Wbm/2/(h+s) and Tan β=h/Wbm/2: the viewing angle range without domain lines is (−α, α), (β,90°) and (−90°,β), namely (−72°,+72°), (80°,90°) and (−90°,−80°), and the viewing angle range with domains is [−80°,−72°] and [72°, 80°]. Thus, the large viewing angle effect can be guaranteed and the domain lines are macroscopically invisible.

As the aperture ratio of the short side of the sub-pixel is Dp=1−Wbm/Wsub=(1−20/50)*100%=60%, in view of the transmittance, the sub-pixel may be arranged as below: in the ADS mode or the IPS mode, as illustrated in FIG. 3a, the long side of the sub-pixel may be arranged along the extension direction of the gate line 260 and the sub-pixel is elongated; and in the FFS mode, as illustrated in FIG. 3b, the sub-pixels (e.g., RGB) may be periodically arranged according to color along the extension direction of the gate line 260.

In addition, the spacers 140 may be disposed at wide positions of the BMs. As illustrated in FIGS. 3a and 3b, the BMs include first extensions 131 and second extensions 132 which are extended along the gate lines 260 and the data lines 270 respectively. The spacers may be disposed at corresponding areas of the first extensions 131 extended along the gate lines 260 (namely the Gate-side BMs). Supposing the second extensions 132 of the BMs 130 (namely the Data-side BMs) is 8 µm, as calculated in conventional square pixels, the aperture ratio of the ADS mode is 56.8%; the aperture ratio of the CFs of the IPS mode is similar to that of the ADS mode; and the aperture ratio of the CFs of the FFS mode is 31.2%. Thus, the proposal preferably adopts ADS mode or IPS mode.

Example 2: the thickness of the liquid crystal layer is d=2.5 µm; the pre-tilt angle of the liquid crystals induced by the first/second alignment films is TBA=2°; the level difference of the first/second alignment adjustment structures is h=h'=1 µm; the width of the sub-pixel is Wsub=28.7 µm; the width of the first extensions 131 of the BMs 130 (namely the Gate-side BMs) is Wbm=11.5 µm; the width of the second extensions 132 of the BMs 130 (namely the Data-side BMs) is 8 µm; the aperture ratio of the CFs of the ADS mode is 54.36%; and the angle range without domains lines and the angle range with domain lines are the same as the example 1. The light refraction is ignored in the example 2.

Example 3: d=2.25 µm may be preferably adopted on the basis of the example 1, so the angle α can be further increased to 77.3 degrees, and hence the range without domain lines can be optimized.

Example 4: d=2.25 μm may be preferably adopted on the basis of the example 2, so the angle α can be further increased to 78.9 degrees, and hence the range without domain lines can be optimized.

It should be noted that the viewing angle in the examples 1 to 4 is divided into the case with domain lines and the case without domain lines. But actually, as the areas of the domains are very small and do not have significant differences macroscopically, due to the limitation of the size of the sub-pixels, the examples are particularly applicable to high-resolution products. The ADS mode or the IPS mode mainly solves the problem of color shift at large viewing angles when observed from the left and right viewing angles, and the FFS mode mainly solves the problem of color shift at large viewing angles when observed from the up and down viewing angles.

In addition, in the examples 1 to 4, a is relevant to TBA, Wsub, Dp and d, and β is relevant to TBA, Wsub and Dp. The examples 1 to 4 are only illustrative. Flexible adjustment can be made by those skilled in the art according to design requirements on the basis of provided geometrical relationship and parameter restriction. No further description will be given here.

The included angle between the liquid crystals and the horizontal direction can be reduced as much as possible by the setting of the above parameters, so that the pre-tilt angle of the liquid crystals on the display panel is integrally close to or equal to 0°. Moreover, the liquid crystal domains can be reduced and the process implementability can be improved.

Second Embodiment

In the display panel provided by the embodiment, at least one of the first alignment adjustment structures 150 and the second alignment adjustment structures 250 may include one layer (as shown in FIG. 2) and may also include a plurality of layers.

Figure 6:
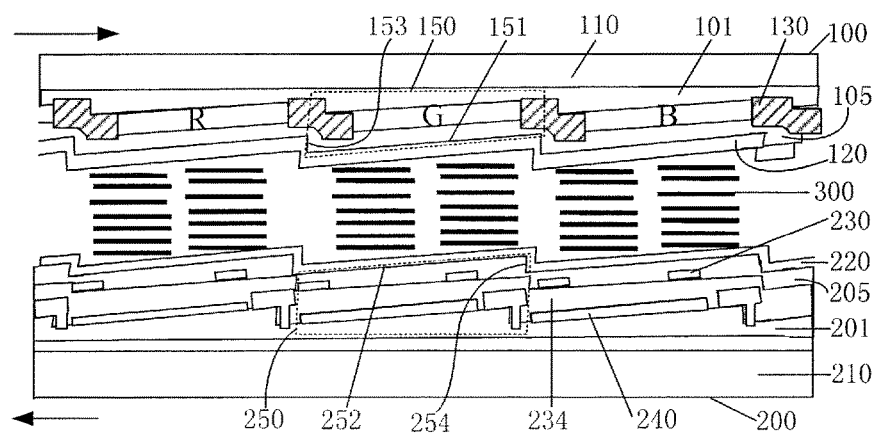
FIG. 6 is a schematic structural view of a display panel provided by a second embodiment of the present disclosure.

The embodiment provides a display panel. As illustrated in FIG. 6, in the display panel, both first alignment adjustment structures 150 and second alignment adjustment structures 250 include a plurality of layers.

A first substrate 100 includes a first substrate layer 101, a plurality of sub-pixels (e.g., RGB) arranged in a matrix, BMs 130 disposed between the sub-pixels, a first functional layer 105 disposed on the sub-pixels and the BMs 130 and provided with a plurality of first surfaces 151, and a first alignment film 120 covering the first functional layer 105, disposed on a first base substrate 110. For instance, the first substrate layer 101 and the first functional layer 105 may be made from silicon nitride, silicon oxide, resins, etc.

A second substrate 200 includes a second substrate layer 201, plate common electrodes 240, an insulating layer (e.g., a laminated layer of a gate insulating layer and a passivation layer), slit pixel electrodes 230 disposed on the insulating layer 234, a second functional layer 205 provided with a plurality of second surfaces 252, and a second alignment film 220 disposed on the second functional layer 205, disposed on a second base substrate 210 in sequence. For instance, the second substrate layer 201 and the second functional layer may be made from silicon nitride, silicon oxide, resins, etc.

The difference between the embodiment and the first embodiment is that: in the first embodiment, corresponding alignment adjustment structures are formed by forming the convex or concave structures by utilization of the materials of the first and second functional layers; and in the embodiment, corresponding alignment adjustment structures are formed by forming substrate layers provided with inclined surfaces (parallel to corresponding first/second surface) on the base substrates at first and subsequently forming other layers on the substrate layers according to conventional processes, so that the horizontal electric field within one pixel can be more uniformly distributed.

The arrangement of the structures in the display panel provided by the embodiment may be found in the first embodiment. No further description will be given here.

Third Embodiment

Figure 7A:
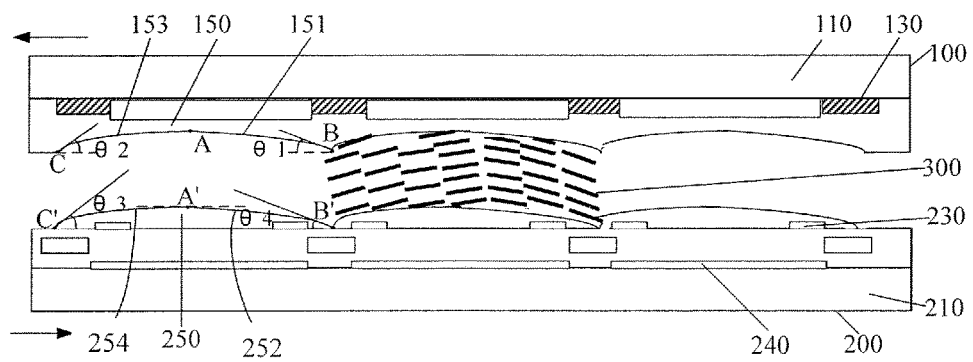
FIG. 7a is a schematic structural view of a display panel provided by a third embodiment of the present disclosure.

The embodiment provides a display panel. As illustrated in FIG. 7a, the difference between the display panel and the display panel provided by the first embodiment is that at least one of the first surface 151 and the second surface 252 may be a curved surface which may be a concave curved surface or a convex curved surface. Description is given in FIG. 7a by taking the case that the first surface 151 is a concave curved surface and the second surface 252 is a convex curved surface as an example.

As illustrated in FIG. 7a, an orthographic projection of the top B of the first surface 151 on the first base substrate 110 and an orthographic projection of the bottom A of the first surface 151 on the first base substrate 110, along the fluctuation direction of the first surface 151, are consistent with the alignment direction of the liquid crystal molecules (as shown by an arrow from right to left disposed in the upper part in FIG. 7a) induced by the first alignment film (which is not shown in FIG. 7a and may refer to FIGS. 2 and 6); and an orthographic projection of the top A' of the second surface 252 on the second base substrate 210 and an orthographic projection of the bottom B' of the second surface 252 on the second base substrate 210, along the fluctuation direction of the second surface 252, are consistent with the alignment direction of the liquid crystal molecules (as shown by an arrow from left to right disposed in the lower part in FIG. 7a) induced by the second alignment film (which is not shown in FIG. 7a and may refer to FIGS. 2 and 6).

In at least one example of the embodiment, the first alignment adjustment structure 150 further includes a third surface 153 intercrossed with one end (the bottom A) of the first surface 151, and the first surface 151 and the third surface 153 may form a concave curved surface BAC which is concave towards the first base substrate 110; and the second alignment adjustment structure 250 further includes a fourth surface 254 intercrossed with one end (the top A') of the second surface 252, and the second surface 252 and the fourth surface 254 may form a convex curved surface C'A'B' which is convex towards the liquid crystal layer 300.

For instance, the fluctuation direction of the concave curved surface BAC (namely the direction from a portion with a small degree of concavity to a portion with a large degree of concavity) may be consistent with the alignment direction of the liquid crystal molecules in the liquid crystal layer induced by the first alignment film. For instance, in FIG. 7a, the degree of concavity of the BA side of the concave curved surface BAC may be set to be less than the degree of concavity of the AC side, so that the overall fluctuation direction of the concave curved surface BAC is from the first surface 151 to the third surface 153, namely consistent with the alignment direction of the liquid crystal molecules induced by the first alignment film.

For instance, the included angle θ1 between the first base substrate 110 and a tangent on the top B of the first surface 151 may be less than the included angle θ2 between the first base substrate 110 and a tangent on the top C of the third surface 153, so that the mean value of the distance from points on the first surface 151 to the first base substrate 110 can be greater than the mean value of the distance from points on the third surface 153 to the first base substrate 110. Therefore, the overall fluctuation direction of the concave curved surface BAC is from the first surface 151 to the third surface 153.

Similarly, the fluctuation direction of the convex curved surface C'A'B' (namely the direction from a portion with a large degree of convexity to a portion with a small degree of convexity) may be consistent with the alignment direction of the liquid crystal molecules in the liquid crystal layer induced by the second alignment film. For instance, as illustrated in FIG. 7a, the degree of convexity of the C'A' side of the convex curved surface C'A'B' may be set to be greater than the degree of convexity of the A'B' side, so that the overall fluctuation direction of the convex curved surface C'A'B' is from the fourth surface 254 to the second surface 252, namely consistent with the alignment direction of the liquid crystal molecules induced by the second alignment film.

For instance, the included angle θ3 between the first base substrate 110 and a tangent at the bottom C' of the fourth surface 254 may be greater than the included angle θ4 between the first base substrate 110 and a tangent at the bottom B' of the second surface 252, so that the overall fluctuation direction of the concave curved surface C'A'B' is from the fourth surface 254 to the second surface 252.

Of course, the embodiment of the present disclosure is not limited to the case as shown in FIG. 7a. For instance, the included angle θ3 between the first base substrate 110 and the tangent at the bottom C' of the fourth surface 254 may also be less than the included angle θ4 between the first base substrate 110 and the tangent at the bottom B' of the second surface 252, as long as the fluctuation direction of the second surface and the overall fluctuation direction of the convex curved surface C'A'B' are consistent with the alignment direction of the liquid crystal molecules induced by the second alignment film.

In at least one example of the embodiment, the pre-tilt angle of the liquid crystals induced by the alignment film is less than or equal to 3°, preferably about 2°. In this case, the difference between the first base substrate 110 and the tangents at both ends B and C of the concave curved surface BAC formed by the first surface 151 and the third surface 153 respectively may be less than or equal to 2°, and the difference between the second base substrate 210 and the tangents at both ends C' and B' of the convex curved surface C'A'B' formed by the second surface 252 and the fourth surface 254 respectively may be less than or equal to 2°.

For instance, the included angle between the first base substrate 110 and a tangent at a point of the first surface 151 may be 0 to 1 degree, e.g., the included angle θ1 between the first base substrate 110 and the tangent on the top B of the first surface 151 is 1°, and the included angle between the first base substrate 110 and the tangent at the bottom A is 0°; and/or the included angle between the first base substrate 110 and a tangent at a point of the third surface 153 may be 0 to 3 degrees, e.g., the included angle θ2 between the first base substrate 110 and the tangent on the top C of the third surface 153 is 3°, and the included angle between the first base substrate 110 and the tangent at the bottom A is 0°.

Similarly, for instance, the included angle between the second base substrate 210 and a tangent at a point of the fourth surface 254 is 0 to 3 degrees, and/or the included angle between the second base substrate 210 and a tangent at a point of the second surface 252 is 0 to 1 degree.

For instance, the included angle θ1 between the first base substrate 110 and the tangent on the top B of the first surface 151 may be 2°; the included angle θ2 between the first base substrate 110 and the tangent on the top C of the third surface 153 may be 4°; the included angle θ3 between the first base substrate 110 and the tangent at the bottom C' of the fourth surface 254 may be 4°; and the included angle θ4 between the first base substrate 110 and the tangent at the bottom B' of the second surface 252 may be 2°.

Figure 7B:
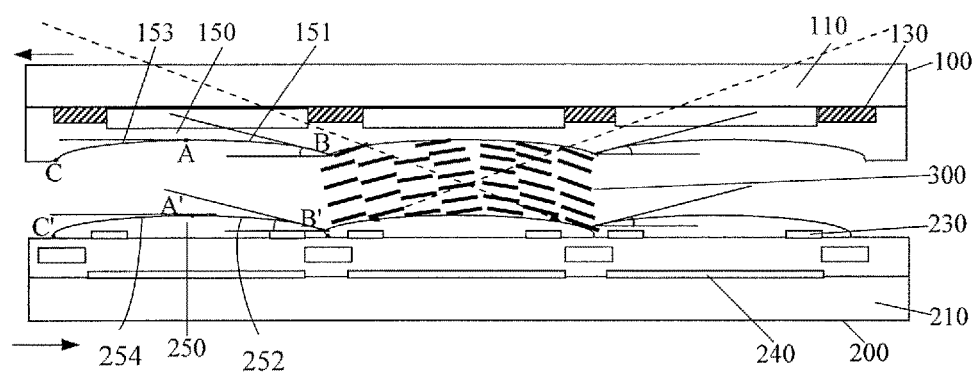
FIG. 7b is a schematic structural view of the display panel provided by the third embodiment of the present disclosure.

As the convex curved surface C'A'B' and the concave curved surface BAC are irregular arcuate structures, the processing technology is complex. In order to reduce the processing difficulty, in at least one example of the embodiment, the convex curved surface C'A'B' and the concave curved surface BAC may be circular surfaces as shown in FIG. 7b. In this case, the included angle between the first base substrate 110 and the tangents at both ends B and C of the concave curved surface BAC respectively is equal, and the included angle between the second base substrate 210 and the tangents at both ends C' and B' of the convex curved surface C'A'B' respectively is equal.

For instance, as illustrated in FIG. 7b, the curvature radius of the second alignment adjustment structure 250 may be 313 μm, and the aperture angle may be 9.160, as shown by dotted lines in FIG. 7b. The curvature radius and the aperture angle of the first alignment adjustment structure 150 may be similar to those of the second alignment adjustment structure 250.

In the case as shown in FIGS. 7a and 7b, the surfaces of the first alignment adjustment structure 150 and the second alignment adjustment structure 250 facing the liquid crystal layer (e.g., the concave curved surface BAC and the convex curved surface C'A'B') are set to be irregular arcuate or circular shape, so that each group of the concave curved surface BAC and the convex curved surface C'A'B' may form a structure similar to a circular ring, and hence the liquid crystal layer between each group of alignment adjustment structures is converted from the plane as shown in FIG. 1a to a curved surface, namely the arrangement state of the liquid crystals is slightly bent state. In this case, when observed from large viewing angles under the L0 frame, if the left viewing angle and the right viewing angle are equal to each other, the optical path difference of the left viewing angle and the right viewing angle is approximately equal to each other. Moreover, as the concave curved surface of the first alignment adjustment structure and the convex curved surface of the second alignment adjustment structure have small degree of curvature, the concave curved surface and the convex curved surface may be regarded as having large curvature radius. When the curvature radius is large enough, the curvature radius of the concave curved surface and the convex curved surface may be regarded as being equal. Thus, the entire liquid crystal layer of the display panel may be similar to a cyclic structure, and the optical path difference when observed from any angle is approximately equal. Therefore, the embodiment can avoid the problem of color shift at large viewing angles under the L0 frame.

In at least one example of the embodiment, the height difference of points on each concave curved surface BAC may be less than or equal to 2 μm, e.g., the height difference between the bottom A and the top B/C is 2 μm; and the height difference of points on each convex curved surface C'A'B' may be less than or equal to 2 μm, e.g., the height difference between the top A' and the bottom B'/C' is 2 μm. As the curvature radius of the concave curved surface and the convex curved surface is large and the height difference of high and low points is small, the alignment adjustment structures will not affect the alignment direction of the alignment films.

In the embodiment, each sub-pixel may correspond to at least one first surface 151 and at least one second surface 252. Description is given below by taking the surface of the first alignment adjustment structure 150 facing the liquid crystal layer 300 (namely the concave curved surface BAC) and the surface of the second alignment adjustment structure 250 facing the liquid crystal layer 300 (namely the convex curved surface C'A'B') as shown in FIGS. 7a and 7b as an example.

For instance, the first surfaces 151 and the second surfaces 252 may be in one-to-one correspondence (namely the first alignment adjustment structures 150 and the second alignment adjustment structures 250 are in one-to-one correspondence). In this case, the concave curved surface BAC of the first alignment adjustment structure 150 and the convex curved surface C'A'B' of the second alignment adjustment structure 250 may be set to be parallel to each other, so that the influence of the alignment adjustment structures on the liquid crystal layer can be avoided as much as possible, and hence the thickness of various places of the liquid crystal layer 300 can be kept consistent. Therefore, the optical path difference of the left viewing angle and the right viewing angle when observed from the left viewing angle and the right viewing angle can be reduced as much as possible, and hence the problem of color shift at large viewing angles of the display panel under the L0 frame can be avoided as much as possible.

For instance, when the first alignment adjustment structures 150 and the second alignment adjustment structures 250 are in one-to-one correspondence and surfaces thereof corresponding to the liquid crystal layer respectively are parallel to each other, an orthographic projection of the concave curved surface BAC of the first alignment adjustment structure 150 on the first base substrate 110 may also be superimposed with an orthographic projection of the convex curved surface C'A'B' of the second alignment adjustment structure 250. Thus, the surfaces of the first and second alignment adjustment structures facing the liquid crystal layer not only are parallel to each other but also have same shape and size, so that the influence of the alignment adjustment structures on the thickness of the liquid crystal layer can be further avoided. Therefore, the uniformity of the thickness of the liquid crystal layer can be guaranteed, and hence the problem of color shift can be more conveniently avoided.

For instance, the sub-pixel, the first surface 151 and the second surface 252 are in one-to-one correspondence, namely the sub-pixel, the first alignment adjustment structure 150 and the second alignment adjustment structure 250 are also in one-to-one correspondence. In this case, both the edge of the concave curved surface BAC of each first alignment adjustment structure 150 and the edge of the convex curved surface C'A'B' of each second alignment adjustment structure 250 may be disposed between adjacent sub-pixels, so that junctions of adjacent alignment adjustment structures correspond to BM areas between the sub-pixels, and hence the influence of the liquid crystal domains at the junctions on the display effect can be avoided as much as possible.

It should be noted that the alignment adjustment structure on one of the array substrate and the opposing substrate of the display panel may include a concave curved surface, and the alignment adjustment structure on the other substrate may include a convex curved surface, which is not limited to the case as shown in FIGS. 7a and 7b.

The alignment adjustment structure including the convex curved surface or the concave curved surface in the embodiment may include one layer (refer to relevant description in the first embodiment) and may also include a plurality of layers (refer to relevant description in the second embodiment).

In addition, the first and second alignment films are not shown in FIGS. 7a and 7b. Moreover, the scope of application of the embodiment, the size relationship between the first and second alignment adjustment structures and the spacers, the corresponding relationship between the sub-pixels and the first and second alignment adjustment structures, and the like may refer to relevant description in the first embodiment. No further description will be given here.

Fourth Embodiment

The embodiment further provides a display device, which comprises the display panel provided by any foregoing embodiment. For instance, in some examples, the display device may further comprise a backlight which provides backlight for the display panel. For instance, the display device may be: any product or component with display function such as an LCD panel, e-paper, a mobile phone, a computer, a TV, a display, a notebook computer, a digital picture frame and a navigator.

In summary, the embodiments of the present disclosure provide the display panel and the display device. As the alignment adjustment structures are respectively disposed on the array substrate and the opposing substrate, the alignment films on the substrates are inclined relative to the horizontal direction, so that the included angle between the liquid crystal molecules in the liquid crystal layer and the horizontal direction can be reduced, and hence the problem of color shift at left and right large viewing angles of the horizontal electric field LCD device under the L0 frame can be solved. Moreover, the restriction on the material of the alignment films can be broken through, so the production of approximate 0° TBA products becomes possible.

The foregoing is only the preferred embodiments of the present disclosure and not intended to limit the scope of protection of the present disclosure. The scope of protection of the present disclosure should be defined by the appended claims.

The application claims priority to the Chinese patent application No. 201510228123.5, filed May 6, 2015, the disclosure of which is incorporated herein by reference as part of the application.

What is claimed is:

1. A display panel, comprising:
a first substrate comprising a first base substrate, a first alignment film disposed on the first base substrate, and a plurality of first alignment adjustment structures disposed between the first base substrate and the first alignment film, in which the first alignment film includes a plurality of first portions corresponding to the plurality of first alignment adjustment structures respectively;
a second substrate arranged opposite to the first substrate and comprising a second base substrate, a second alignment film disposed on the second base substrate, and a plurality of second alignment adjustment structures disposed between the second base substrate and the second alignment film, in which the second alignment film includes a plurality of second portions corresponding to the plurality of second alignment adjustment structures respectively; and a liquid crystal layer disposed between the first alignment film and the second alignment film, wherein each first alignment adjustment structure includes a first surface facing the first alignment film, and a fluctuation direction of the first surface and a fluctuation direction of each of the first portions are consistent with the alignment direction of liquid crystal molecules in the liquid crystal layer induced by the first alignment film;

each second alignment adjustment structure includes a second surface facing the second alignment film, and a fluctuation direction of the second surface and a fluctuation direction of each of the second portions are consistent with the alignment direction of the liquid crystal molecules in the liquid crystal layer induced by the second alignment film;

within one sub-pixel, alignment directions of the liquid crystal molecules induced by the first alignment film are identical, and alignment directions of the liquid crystal molecules induced by the second alignment film are identical.

2. The display panel according to claim 1, wherein a surface provided with each of the first portions therein is parallel to the first surface of the first alignment adjustment structure corresponding to each of the first portions; and/or a surface provided with each of the second portions therein is parallel to the second surface of the second alignment adjustment structure corresponding to each of the second portions.

3. The display panel according to claim 1, wherein a plurality of sub-pixels arranged in a matrix are disposed between the first base substrate and the second base substrate; and each sub-pixel corresponds to at least one first surface and at least one second surface.

4. The display panel according to claim 3, wherein each sub-pixel corresponds to one first surface and one second surface; each first surface and each second surface correspond to one sub-pixel; and both an edge of the surface of each first alignment adjustment structure facing the liquid crystal layer and an edge of the surface of each second alignment adjustment structure facing the liquid crystal layer are disposed between adjacent sub-pixels.

5. The display panel according to claim 3, wherein the at least one first surface and the at least one second surface are in one-to-one correspondence; and the surface of the first alignment adjustment structure facing the liquid crystal layer is parallel to the surface of the second alignment adjustment structure facing the liquid crystal layer.

6. The display panel according to claim 4, wherein an orthographic projection of the surface of the second alignment adjustment structure facing the liquid crystal layer is superimposed with an orthographic projection of the surface of the first alignment adjustment structure facing the liquid crystal layer.

7. The display panel according to claim 3, wherein a thickness of the liquid crystal layer is more than or equal to 2.25 μm and less than or equal to 2.5 μm;

a width of each sub-pixel is less than or equal to 50 μm along a direction parallel to the first base substrate;

a level difference of the first surface is 1 to 2 μm; and a level difference of the second surface is 1 to 2 μm.

8. The display panel according to claim 1, wherein a plurality of spacers are disposed between the first base substrate and the second base substrate; and a distance of a top of each spacer beyond a top of the first alignment adjustment structure is equal to a thickness of the liquid crystal layer, and/or a distance of the top of each spacer beyond a top of the second alignment adjustment structure is equal to the thickness of the liquid crystal layer.

9. The display panel according to claim 1, wherein the first surface is a plane, each first alignment adjustment structure further includes a third surface intercrossed with one end of the first surface, and the third surface is perpendicular to the first base substrate; and/or the second surface is a plane, each second alignment adjustment structure further includes a fourth surface intercrossed with one end of the second surface, and the fourth surface is perpendicular to the second base substrate.

10. The display panel according to claim 1, wherein black matrixes (BMs) are disposed between the first base substrate and the second base substrate;

the first surface is a plane, the first alignment adjustment structure further includes a third surface intercrossed with one end of the first surface, and the third surface is disposed in an area provided with the BMs; and/or the second surface is a plane, the second alignment adjustment structure further includes a fourth surface intercrossed with one end of the second surface, and the fourth surface is disposed in an area provided with the BMs.

11. The display panel according to claim 1, wherein the first surface is a plane and an included angle between the first surface and the first base substrate is less than or equal to 3°; and/or the second surface is a plane and an included angle between the second surface and the second base substrate is less than or equal to 3°.

12. The display panel according to claim 1, wherein one of the first substrate and the second substrate includes pixel electrodes and common electrodes;

a plurality of sub-pixels arranged in a matrix are also disposed between the first base substrate and the second base substrate; each row of sub-pixels are periodically arranged according to color; each column of sub-pixels have a same color;

the pixel electrodes and the common electrodes are arranged in the same layer; or the pixel electrodes and the common electrodes are arranged in different layers, and one kind of the pixel electrodes and the common electrodes are slit electrodes and the other kind are plate electrodes; and the fluctuation direction of the first surface and the second surface is consistent with the row direction of the sub-pixels.

13. The display panel according to claim 12, wherein the first alignment adjustment structures and the second alignment adjustment structures are arranged at intervals along the column direction of the sub-pixels.

14. The display panel according to claim 12, wherein a plurality of gate lines and a plurality of data lines are also disposed between the first base substrate and the second base substrate; and along a direction parallel to the first base substrate, a longitudinal direction of each sub-pixel is consistent with an extension direction of the gate lines, and the transverse direction of each sub-pixel is consistent with an extension direction of the data lines.

15. The display panel according to claim 1, wherein one of the first substrate and the second substrate includes pixel electrodes and common electrodes;
- a plurality of sub-pixels arranged in a matrix are also disposed between the first base substrate and the second base substrate; in the plurality of sub-pixels arranged in a matrix, each row of sub-pixels are periodically arranged according to color and each column of sub-pixels have a same color;
- the pixel electrodes and the common electrodes are arranged in different layers, and both the pixel electrodes and the common electrodes are slit electrodes; and
- the fluctuation direction of the first surface and the second surface is consistent with a column direction of the sub-pixels.

16. The display panel according to claim 15, wherein a plurality of gate lines and a plurality of data lines are also disposed between the first base substrate and the second base substrate; and
- a longitudinal direction of each sub-pixel is along an extension direction of the data lines, and a transverse direction of the sub-pixel is along an extension direction of the gate lines.

17. A display device, comprising the display panel according to claim 1.

* * * * *